(12) United States Patent
Ozbaysal et al.

(10) Patent No.: US 9,347,124 B2
(45) Date of Patent: May 24, 2016

(54) HOLD AND COOL PROCESS FOR SUPERALLOY JOINING

(75) Inventors: Kazim Ozbaysal, Orlando, FL (US);
Zafir A. M. Abdo, Orlando, FL (US);
Ovidiu Timotin, Hamilton (CA);
Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 870 days.

(21) Appl. No.: 13/489,863

(22) Filed: Jun. 6, 2012

(65) Prior Publication Data
US 2015/0050157 A1    Feb. 19, 2015

Related U.S. Application Data

(60) Provisional application No. 61/556,395, filed on Nov. 7, 2011.

(51) Int. Cl.

| C22C 19/03 | (2006.01) |
|---|---|
| C22F 1/10 | (2006.01) |
| B23K 9/04 | (2006.01) |
| B23K 26/34 | (2014.01) |
| B23K 26/30 | (2014.01) |
| B23K 37/00 | (2006.01) |
| F01D 5/00 | (2006.01) |
| B23K 26/32 | (2014.01) |

(52) U.S. Cl.
CPC ... *C22F 1/10* (2013.01); *B23K 9/04* (2013.01); *B23K 26/32* (2013.01); *B23K 26/342* (2015.10); *B23K 26/345* (2013.01); *B23K 26/423* (2013.01); *B23K 26/703* (2015.10); *B23K 37/003* (2013.01); *C22C 19/03* (2013.01); *F01D 5/005* (2013.01); *B23K 2201/001* (2013.01); *B23K 2203/08* (2013.01); *B23K 2203/10* (2013.01); *B23K 2203/14* (2013.01); *F05D 2230/232* (2013.01); *F05D 2230/31* (2013.01); *F05D 2230/40* (2013.01); *F05D 2230/80* (2013.01); *F05D 2300/177* (2013.01); *Y10T 403/477* (2015.01)

(58) Field of Classification Search
None
See application file for complete search history.

(56) References Cited

U.S. PATENT DOCUMENTS

| 5,240,167 A | 8/1993 | Ferte et al. |
|---|---|---|
| 5,374,319 A | 12/1994 | Stueber et al. |
| 5,509,980 A | 4/1996 | Lim |
| 2004/0112940 A1 | 6/2004 | Caddell et al. |
| 2006/0042729 A1 | 3/2006 | Kottilingam et al. |
| 2009/0320966 A1 | 12/2009 | Morin |

FOREIGN PATENT DOCUMENTS

| CN | 1455714 | | 11/2001 |
|---|---|---|---|
| CN | 1401458 | A | 11/2002 |
| CN | 1585829 | A | 5/2003 |
| CN | 1714989 | A | 12/2005 |
| CN | 1800425 | A | 6/2006 |
| WO | 0187528 | A2 | 11/2001 |

*Primary Examiner* — Adam Krupicka

(57) ABSTRACT

Ni base superalloys containing relatively large amounts of Al and/or Ti are known to be difficult to weld satisfactorily. As the Al and Ti content of the superalloy is increased to improve the strength, the weldability of the component is drastically reduced. It is concluded herein that reducing the γ' phase improves weldability. A stepwise, controlled heating and cooling process is described to be used in cooperation with a welding process to reduce the γ' present and thereby improve weldability.

10 Claims, 3 Drawing Sheets

HOLD AND COOL PROCESS FOR SUPERALLOY JOINING

CLAIM TO PRIORITY

This is a utility patent application filed pursuant to 35 U.S.C. §111 (a), and claims priority pursuant to 35 U.S.C. §119 from provisional patent application 61/556,395 filed Nov. 7, 2011. The entire contents of the aforesaid provisional patent application is incorporated herein by reference for all purposes.

BACKGROUND OF THE INVENTION

1. Field of the Invention

The present invention relates to the repair or joining of superalloy components, and more particularly, to the weld built up of nickel base superalloy components, and most particularly, to the welding of nickel base superalloy components containing relatively large amounts of aluminum and/or titanium.

2. Background and Related Art

Superalloys are typically understood to be high-temperature materials which display excellent resistance to mechanical and chemical degradation of properties even as temperatures approach the melting points of the materials. Ni base superalloys are based upon nickel (Ni) and typically contain significant amounts of numerous other elements such as chromium (Cr), aluminum (Al), titanium (Ti), tungsten (W), cobalt (Co), tantalum (Ta), carbon (C), among others. The high-temperature superalloys found early application in aircraft turbine engines. Since a higher operating temperature typically leads to increased fuel efficiency and lower carbon emissions, causing superalloys to find increasing uses in ground-bases turbine systems as well. For example, see *The Superalloys*, by Roger C. Reed, (Cambridge University Press, 2006, particularly Chapter 1. The entire contents of this reference is incorporated herein by reference for all purposes.

Thus, as superalloys are used in greater numbers of airborne and ground-based turbine systems, and operated at higher temperatures, increasing number of blades vanes and other components are subject to cracking and other forms of material degradation requiring repair. It is important that the repair of such turbine components be effectively carried out to result in repaired components having properties as close as possible to those of the original components.

The economic importance of superalloys has generated considerable research in their welding and repair. See, for example, *Welding Metallurgy and Weldability of Nickel-Base Alloys*, by J. N. DuPont, J. C. Lippold, Samuel D. Kiser (John Wiley & Sons, 2009), particularly Chapter 4. The entire contents of this reference is incorporated herein by reference for all purposes.

Welding is a commercially important method for repairing or joining Ni base superalloy components. However, as Al and/or Ti are added to the superalloy to improve high temperature strength of the components, it becomes much more difficult to weld the components, typically being subject to cracking or other defects. Thus a need exists in the art for improved methods to weld Ni base superalloy components, particularly those including relatively large amounts of Al and/or Ti.

BRIEF SUMMARY OF THE INVENTION

It is one objective of the processes described herein to provide a process for joining Ni based superalloys by heating and controlled stepwise cooling of the joined region so as to produce no more than 20% $\gamma'$ in one cool and hold portion of the process.

The processes described herein provide for elemental partitioning of Al and Ti during the hold and cool process so as to deplete $\gamma$ from Al and Ti and to improve weldability.

Accordingly and advantageously, these and other advantages are achieved in accordance with the present invention as described in detail below.

(2A): Elemental partitioning at full phase equilibrium from Ni—Al pseudo binary phase diagram.

(2B) Shift in TTT (time-temperature-transformation) diagram due to step cool and hold process.

(2C) Anticipated stress relief of the weld at each hold temperature during partitioning of Al and Ti.

(2D) Shift of composition of alloy 247 to crack free region due to partitioning.

Figure 3:
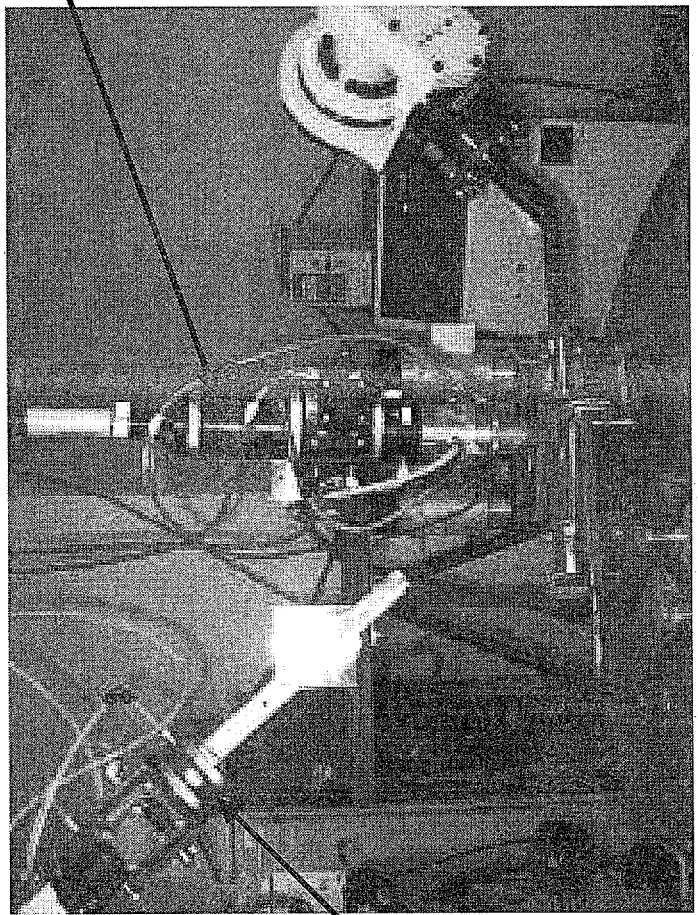

FIG. 3: Typical apparatus for performing a hold and cool process pursuant to some embodiments of the present invention.

DETAILED DESCRIPTION

All percentages given herein are weight percent unless otherwise specified.

Ti and Al are added to Ni base superalloys to increase the high temperature strength of the component, but at the expense of drastically increasing the difficulty of producing satisfactory welds. A more careful study of factors affecting weldability of Ni base superalloys has led the present inventors to conclude that a $\gamma'$ phase present in an amount less than about 30 weight percent is indicative of advantageous weldability, $\gamma'$ greater than about 60% is indicative of nonweldability while intermediate $\gamma'$ values typically indicates difficult and expensive welding.

In summary, the welding process described herein makes use of elemental partitioning of Al and Ti into $\gamma$ and $\gamma'$ phases through a step cool and hold process. This depletes the $\gamma$ phase from Al in a controlled fashion and Ti and improves weldability, typically be achieving a low weight % of $\gamma'$. When the Al and Ti content of the stress relieved $\gamma$ in the joint is reduced to weldable values, the step cool and hold process is terminated and replaced with conventional weld argon cooling.

Typical embodiments of this invention use two heat sources. A first heat source is used for joining, that is a conventional welding process. A laser heat source is advantageously used as this first heat source but other heat sources are not inherently excluded such as arcs, discharges, electron beams, particle beams, among others.

(AF), [0023] ('157) A second heat source is used for the hold and cool portion of the process and adjusts the isothermal hold temperature of the joint to produce no more than about 30% $\gamma'$ from the $\gamma$ at any isothermal hold temperature. A laser heat source is advantageously used as this second heat source but other heat sources are not inherently excluded such as induction heating, electron beams, tungsten halogen bulbs, infrared heating, among others.

(AF), [0024] ('157) Elemental partitioning of Al and Ti is calculated from available thermodynamic data that allows a maximum 30% γ' formation at any isothermal hold temperature. Hold times needed to achieve 30% γ' are calculated from the known phase transformation kinetics of the γ-γ' system.

Figure 1:
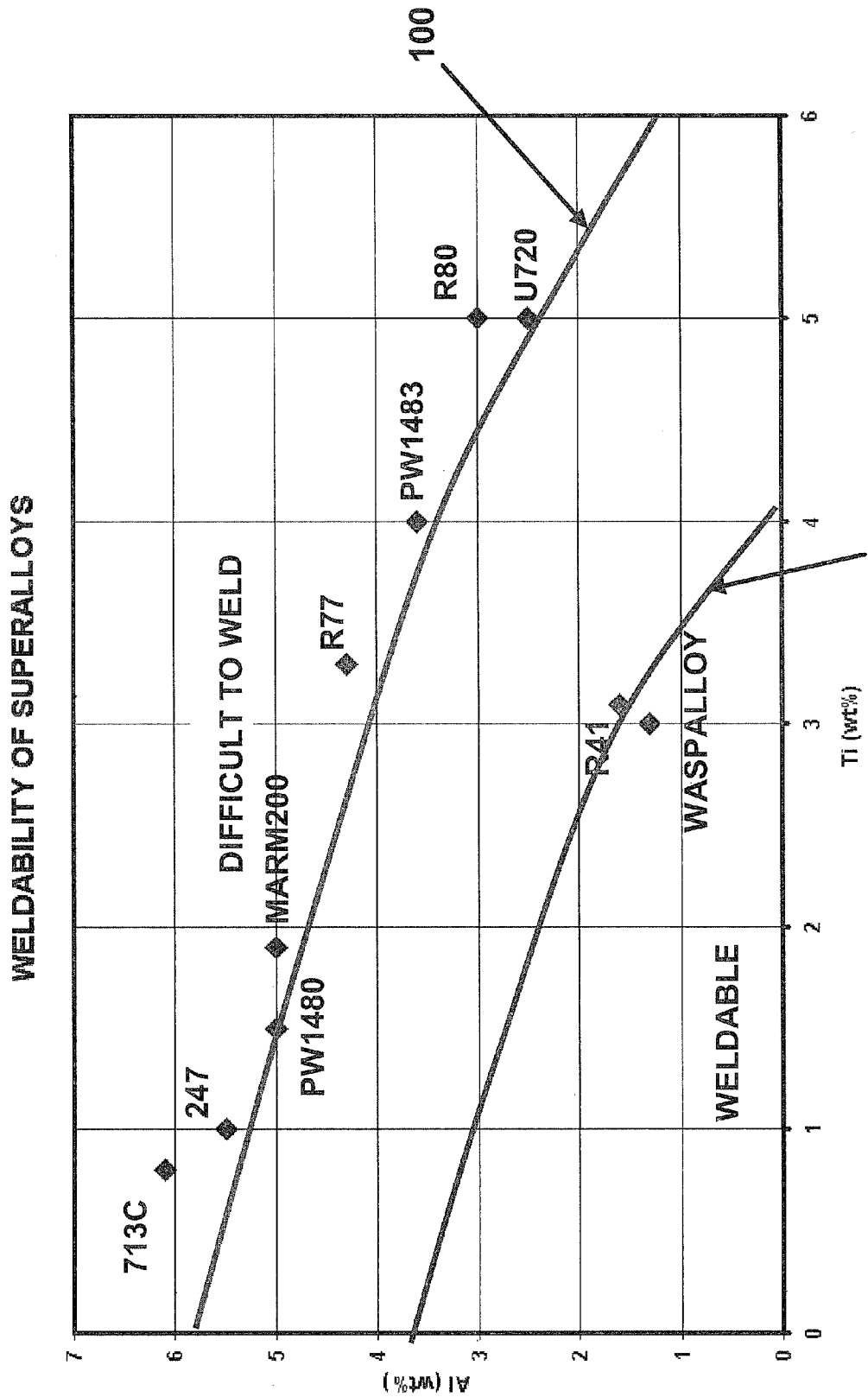
FIG. 1: Graphical depiction of the weldability of some superalloys as a function of Ti and Al content.

FIG. 1 is a graphical depiction of the weldability zone of typical superalloys as a function of their Al and Ti content (in weight percent). Those alloys lying above line 100 are generally considered not to be weldable. A more detailed study of the compositions of the alloys in FIG. 1 shows that the alloys listed above line 100 have more than 60% of the γ' phase in their final structures. In contrast, superalloys lying below line 101 have less than 20% γ' phase in their final structures. Thus, it is anticipated that Ni base superalloys with γ' less than about 20% are expected to be weldable.

Alloys of particular interest here include those noted, on FIG. 1.

(AF), [0027] ('157) Cooling of a superalloy from its melting temperature tends to have superalloys undergoing a transition from γ phase to γ'+γ phases. The hold and cool process described herein employs the elemental partitioning of Al and Ti into γ and γ' phases in full thermodynamic phase equilibrium to produce no more than 30% γ' at any hold time during the hold and cool process. This depletes the γ phase from Al and Ti and moves the final γ composition into the weldable region as depicted in FIG. 1.

FIG. 3 shows a typical joining system including hold and cool capabilities for carrying out processes pursuant to some embodiments of the present invention. The apparatus typically included a heat source for conducting the welding, 201 (typically a laser, Laser 1), and a second heat source for heating the substrate to a predetermined temperature (typically a laser, Laser 2). Heating of the weld location is carried out prior to welding, prior to or as soon as Laser 1 (201) is turned on at the joining location. The initial predetermined temperature of the joining location is advantageously selected to be above about 2100 deg. F.

Figure 2:
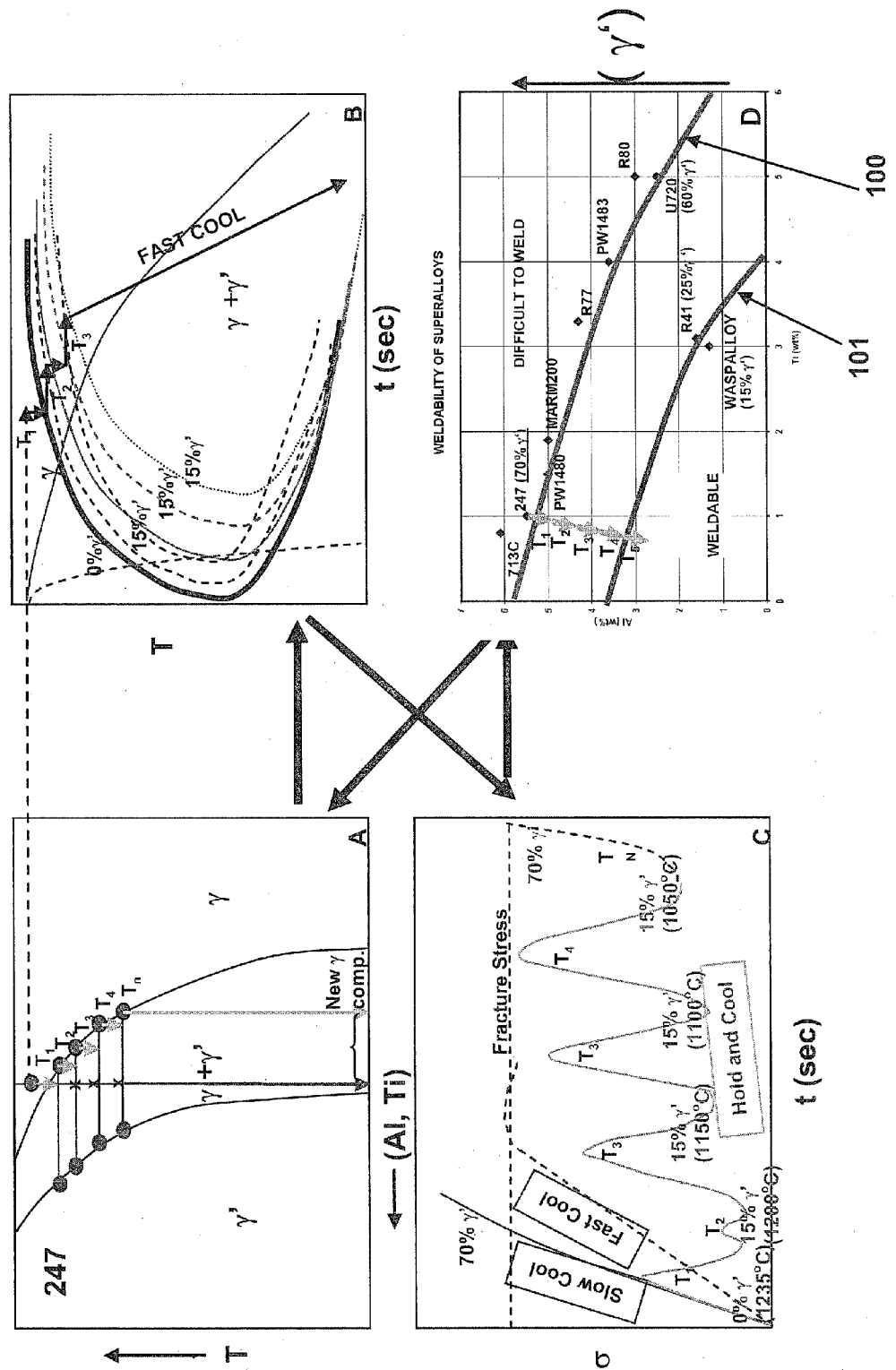
FIG. 2: Graphical depiction of further details of hold and cool process pursuant to some embodiments of the present invention.

FIG. 2 is a schematic depiction of metallurgical reactions for typical high strength Ni superalloys joined by some embodiments of the present hold and cool process. The heat source 202 of FIG. 3 is operational when the joining operation carried out by the welding laser 201 is completed. For the particular example depicted in FIG. 2, the following process was employed after the laser welding process and laser 201 is off:

a. Hold at $T_1$ for 1-3 minutes.
b. Cool to $T_2$ and hold for 2-15 minutes. Produce less than 30% γ'.
c. Cool to $T_3$ and hold for 2-30 minutes. Produce less than 30% γ'.
d. Cool to $T_4$ and hold for 0.1-2 hrs. Produce less than 30% γ'.
(Additional Steps as May be Required or Desirable)
y. Cool to $T_n$, and hold for 1-20 hrs. (n=120) Produce less than 30% γ'
z. Cool to room temperature to produce final 30% or less γ'.

In this process as depicted in FIG. 2, γ is depleted from Al and Ti through elemental partitioning until its final composition is reduced below the weldable line 100 in FIG. 2D. Compositional change of γ is shown with spots $T_1$-$T_n$ in FIG. 2A. FIGS. 2E and 2C show the anticipated shift in the cooling curves and the stress vs. time curve after each hold step due to stress relief of the weld at each hold step.

It is expected that the general hold and cool process as described herein can be used on almost any superalloy that experiences hot cracking as well as strain age cracking. Elemental partitioning of Al and Ti during the hold portions of the process reduces the likelihood of strain age cracking and hot cracking. Such partitioning also significantly reduces the tendency towards strain age cracking during post weld heat treatment since γ is substantially depleted from Al and Ti, and stress relieved, at each step of the hold and cool process.

Although various embodiments which incorporate the teachings of the present invention have been shown and described in detail herein, those skilled in the art can readily devise many other varied embodiments that still incorporate these teachings.

What is claimed is:

1. A nickel base superalloy, alloy 247, including a welded seam therein wherein said welded seam was produced by the process of:
   a) prior to welding, heating the weld location to an initial predetermined temperature above about 2100 deg. F. with a first heat source,
   b) welding said nickel base superalloy with a second heat source; and,
   c) removing said second heat source immediately upon completion of said welding; and,
   d) performing a controlled step cooling of said weld location such that no more than about 30 weight percent of the γ' phase is formed at any hold temperature during the step cool and hold process; and,
   e) cooling said weld location to room temperature to produce a final γ' weight percent of less than 30 percent.

2. A superalloy component assembly having therein the welded seam formed by the process of claim 1.

3. The superalloy component assembly of claim 2, wherein the said component assembly comprises a turbine blade.

4. A superalloy component assembly formed by joining nickel base superalloy components of alloy 247 at one or more joining locations by the process comprising:
   a) heating said one or more joining locations to a temperature above about 2100 deg. F. with a first heat source;
   b) welding said one or more joining locations of said nickel base superalloy components with a second heat source at a temperature above about 2100 deg. F.;
   c) removing said second heat source immediately upon completion of said welding; and,
   d) performing a controlled step and hold cooling of said welds such that no more than about 30 weight percent of the γ' phase is formed at any hold portion of said cooling process; and,
   e) cooling said one or more joining locations to room temperature to produce a final γ' weight percent of less than 30 percent.

5. The superalloy component assembly of claim 4, wherein the said component assembly comprises a turbine blade.

6. A nickel base superalloy, alloy 247, including a welded seam therein wherein said welded seam was produced by the process of:
   a) prior to welding, heating the weld location to an initial predetermined temperature above about 2100 deg. F. with a first heat source,
   b) welding said nickel base superalloy with a second heat source; and,
   c) removing said second heat source immediately upon completion of said welding; and,
   d) performing a controlled step cooling of said weld location such that no more than about 20 weight percent of the γ' phase is formed at any hold temperature during the step cool and hold process; and,
   e) cooling said weld location to room temperature to produce a final γ' weight percent of less than 30 percent.

7. A superalloy component assembly having therein the welded seam formed by the process of claim 6.

8. The superalloy component assembly of claim 7, wherein the said component assembly comprises a turbine blade.

9. A superalloy component assembly formed by joining nickel base superalloy alloy 247 components at one or more joining locations by the process comprising:
   a) heating said one or more joining locations to a temperature above about 2100 deg. F. with a first heat source;
   b) welding said one or more joining locations of said nickel base superalloy components with a second heat source at a temperature above about 2100 deg. F.;
   c) removing said second heat source immediately upon completion of said welding; and,
   d) performing a controlled step and hold cooling of said welds such that no more than about 20 weight percent of the γ' phase is formed at any hold portion of said cooling process; and,
   e) cooling said one or more joining locations to room temperature to produce a final γ' weight percent of less than 30 percent.

10. The superalloy component assembly of claim 9, wherein the said component assembly comprises a turbine blade.

* * * * *